United States Patent [19]

Bunch et al.

[11] Patent Number: 4,741,509

[45] Date of Patent: May 3, 1988

[54] GATE VALVE WITH IMPROVED SECONDARY BODY TO BUSHING SEALS

[75] Inventors: Paul D. Bunch; James E. Kilmoyer, both of Houston, Tex.

[73] Assignee: Cameron Iron Works, Inc., Houston, Tex.

[21] Appl. No.: 16,334

[22] Filed: Feb. 19, 1987

[51] Int. Cl.$^4$ .......................... F16K 25/00; F16K 3/00
[52] U.S. Cl. ..................... 251/172; 251/174; 251/327; 251/328; 277/27; 277/205
[58] Field of Search ............. 251/172, 174, 175, 176, 251/195, 196, 327, 328, 158, 159, 167; 277/27, 139, 140, 205, 206 R

[56] References Cited

U.S. PATENT DOCUMENTS

| | | | |
|---|---|---|---|
| 2,635,022 | 4/1953 | Shirk | 277/140 |
| 2,804,361 | 8/1957 | Shirk | 277/140 |
| 2,927,830 | 3/1960 | Workman | 277/205 |
| 3,006,599 | 10/1961 | Eckert, Jr. | 251/172 |
| 3,533,598 | 10/1970 | Tillman, III | 251/328 |
| 3,901,517 | 8/1975 | Heathcott | 277/205 |
| 4,188,424 | 12/1980 | Ohno et al. | 277/205 |
| 4,244,192 | 1/1981 | Chellis | 277/205 |
| 4,304,409 | 12/1981 | Orlowski | 277/205 |
| 4,471,943 | 9/1984 | Nelson | 251/328 |
| 4,633,911 | 1/1987 | Lohn | 277/206 R |
| 4,643,395 | 2/1987 | Williams, Jr. | 251/328 |
| 4,645,179 | 2/1987 | Ali | 251/328 |

FOREIGN PATENT DOCUMENTS 301920 11/1917 Fed. Rep. of Germany ...... 277/205

Primary Examiner—George L. Walton
Attorney, Agent, or Firm—Vinson & Elkins

[57] ABSTRACT

The gate valve includes a body having a valve member or gate chamber, passages communicating through the body into the chamber, a recess in the body surrounding the opening of each passage into the chamber, a bushing positioned in each of the recesses, a gate positioned within the chamber, means for moving the gate within the chamber between positions communicating flow between the passages and closing flow between the passages, inner and outer unidirectional seals positioned between the surface of each of the recesses facing the gate and the opposing surface of the bushing in the recess, each of the seals include a U-shaped lip sealing element and a U-shaped spring positioned within the lip sealing element and urging the legs of the element apart into sealing engagement between the bushing and the body, the inner seal, which is positioned closest to the passage has the open end of its sealing element facing the passage and the outer seal, which is farther from the passage than the inner seal, has the open end of its sealing facing away from the passage, each of the seals being positioned within a recess in one of the bushing and the body which has a depth less than the height of the seal while it is still in an effective sealing condition, the seals being compressible in height so that their bushings engage the body recess in a metal-to-metal seal when they are loaded and recoverable from such compressed position to provide a tight seal when said loading is relieved. It is preferred that the seals utilize an aromatic polymer such as polyetheretherketone or polyethersulfone for the lip sealing elements and an Elgiloy or nonferrous metal spring material for the spring.

8 Claims, 3 Drawing Sheets

4,741,509

GATE VALVE WITH IMPROVED SECONDARY BODY TO BUSHING SEALS

BACKGROUND

Gate valves have long been provided with an internal gate chamber and passages through the body communicating with the gate chamber which passages are normally aligned with each other. In order to support the gate and to provide a seal between the body and the sides of the gate surrounding the passages, annular bushings have been provided and positioned within shallow recesses surrounding the openings of the passages into the gate chamber.

When the gate is closed, i.e., blocking flow between the passages, the pressure on the gate causes it to be urged in the downstream direction or toward the outlet passage. This brings the downstream bushing into direct metal-to-metal sealing contact with both its recess surface and the surface of the gate. It also moves the gate in a direction away from the upstream bushing which relaxes the loading on the upstream bushing. It is desired that the upstream bushing be provided with seals which ensure sealing between the bushing and the body so that such sealing surfaces are maintained sufficiently clean for subsequent metal-to-metal sealing and also to load the bushing against the gate for sealing.

In prior gate valve structures, attempts have been made to utilize a solid PTFE (polytetrafluoroethylene) square seal design for the body-bushing seal. These seals initially perform well until exposed to field conditions of pressure loading and temperature variations. Under such conditions the solid square PTFE seals have taken permanent deformation from plastic flow which results in loss of seal capability and allows contaminant buildup behind the bushings. Also, if the PTFE seals are restricted from deforming by tight groove dimensions, the seal on the upstream side will extrude when pressure is reversed, which results in the prevention of a metal-to-metal seal between the bushing and the body and thus creating a leak path.

PTFE O rings have problems similar to the solid PTFE seals. The O rings require some means for preloading and for maintaining contact of the bushing against the body. This design is limited to gate valves which have cavity clearances allowing for a wedging mechanism to preload and maintain such contact.

Spring loaded lip seals of PTFE and similar materials have been tested and problems with functioning as a unidirectional seal were encountered. These designs tested have resulted in the seal extruding and collapsing the internal springs when pressure is applied to the heel of the seal, i.e., reversed pressure from its normal sealing direction.

Metal O ring designs have been tested but they have problems in maintaining a pressure tight seal through pressure and temperature cycling. They also require extremely high preload forces which must be maintained during the function of the valve.

U.S. Pat. No. 3,114,561, discloses a composite seal ring composed of a U-shaped body of an inert material, such as polytetrafluoroethylene and an internal spring of stainless steel which is also U-shaped and provided with slots which extend across the top of the U to make it more flexible. In one form of the invention, the spring has two continuous edges and in another form it has only one continuous edge. The purpose of the seal is to provide sealing in an environment in which the fluids attack seals which are not primarily inert. The spring is used because the seal material is not resilient.

U.S. Pat. No. 4,487,393 discloses a wedge type of gate valve in which the valve member or gate is made up of two pieces and on closing one member engages a stop and the other member continues moving with the tapered surfaces between the two members causing the members to be wedged outward from each other into tight sealing engagement with their respective bushings or seat rings. The upstream bushing includes a resilient solid ring engaged between the ring and the gate and both bushings include resilient O rings sealing between the bushings and the body.

U.S. Pat. No. 4,483,511 discloses a ball valve having separate upstream and downstream seat rings with annular springs urging the rings into seating engagement with the ball and an annular seat (or seal ring) positioned in the seat ring to engage the ball. The seals between the seat rings and the body are provided by O rings.

U.S. Pat. No. 4,629,161 discloses a gate valve which uses O rings to seal bushings or seat rings against the radial surfaces of the valve body seat recesses.

U.S. Pat. No. 4,364,544 discloses a gate valve which uses a spring mounted sediment guard to prevent foreign material from depositing between the radial surface of the seat recess and the seat.

Additional sealing structures used with gate valve bushings are illustrated in U.S. Pat. Nos. 2,606,740 (special resilient seal on the exterior of the bushing and extending between the gate and the body), 3,033,224 (sealant supplied to grooves in gate and bushings) and 4,531,711 (O ring seals).

A valve similar to the valve of the present invention is shown in the *Composite Catalog of Oilfield Equipment and Services* 1986–87, *pages* 1015.

SUMMARY

The present invention relates to an improved gate valve and to the improved sealing provided between the body and the bushings which float between the body and the gate. The gate valve includes a body having a valve chamber, passages communicating through the body into the chamber, a recess in the body surrounding the opening of each passage into the chamber, a bushing positioned in each of the recesses, a gate positioned within the chamber and between the bushings, means for moving the gate within the chamber between positions communicating flow between the passages and closing flow between the passages, inner and outer unidirectional seals positioned between the surface of each of the recesses facing the gate and the opposing surface of the bushing in the recess, each of the seals include a U-shaped lip sealing element and a U-shaped spring positioned within the lip sealing element and urging the legs of the element apart into sealing engagement between the bushing and the body, the inner seal, which is positioned closest to the passage, has the open end of its sealing element facing the passage and the outer seal, which is farther from the passage than the inner seal, has the open end of its sealing element facing away from the passage, each of the seals being positioned within a recess in one of the bushings which has a depth less than the height of the seal while it is still in an effective sealing condition, the seals being compressible in height so that the bushings engage the body recess surface in a metal-to-metal seal when they are loaded and recoverable from such loaded position to provide a tight seal when said loading is relieved. It is preferred that the seals utilize an aromatic polymer such as polyetheretherketone or polyethersulfone for the lip sealing elements and springs made from a cobalt nickel alloy such as Elgiloy as made by Elgiloy Company Division of American Gage and Machine Company of Elgin, Ill.

An object of the present invention is to provide an improved gate valve having improved floating bushing secondary seals which maintain the sealing surfaces of the bushing and the body free of contaminants which would interfere with a tight metal-to-metal seal.

Another object is to provide improved secondary seals for a floating bushing in a gate valve which are not subject to extrusion and which do not lose sealing capability responsive to loading and elevated temperatures.

A further object is to provide an improved secondary seals for a floating bushing in a gate valve which do not require excessive loading.

Still another object is to provide an improved secondary seals for a floating bushing in a gate valve which function as a unidirectional seals and do not collapse or extrude when subjected to a pressure reversal.

DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
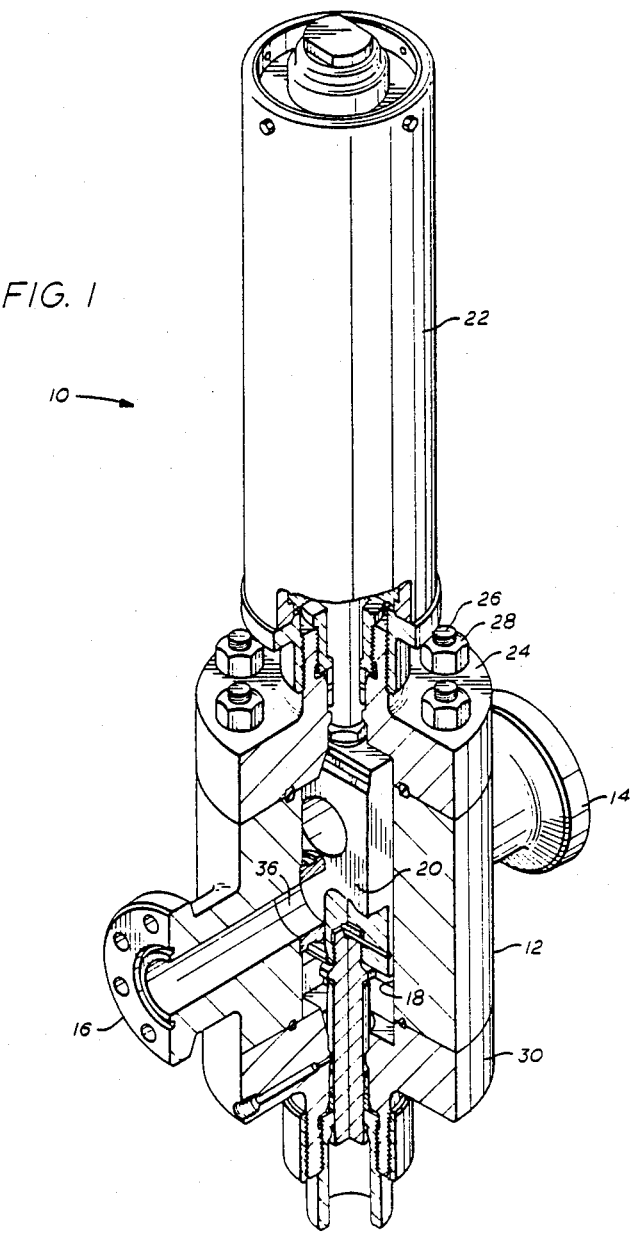
FIG. 1 is an isometric view of the improved gate valve of the present invention shown partly in section to illustrate the location of the improved bushing sealing assembly of the present invention.
Figure 2:
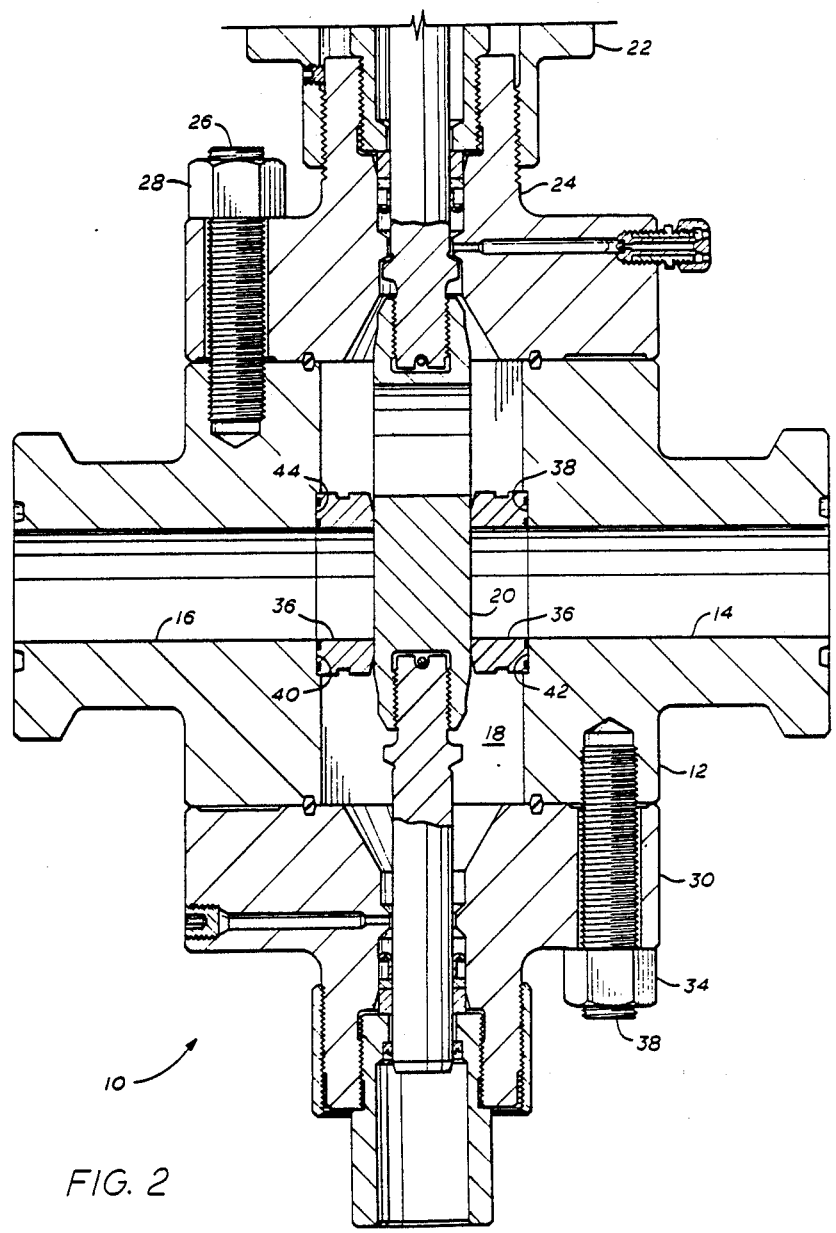
FIG. 2 is a partial detail sectional view of the improved gate valve of the present invention.

As shown in FIGS. 1 and 2, gate valve 10 includes body 12 having inlet 14 and outlet 16 communicating with valve chamber 18, valve member or gate 20 which is positioned within valve chamber 18 and is moved by suitable actuating means between positions opening and closing flow therethrough, such as hydraulic actuator 22, which is supported on bonnet 24. Bonnet 24 is secured to body 12 by studs 26 and nuts 28. Bottom closure 30 is secured to the lower portion of body 12 by studs 32 and nuts 34. Bushings 36 are positioned on opposite sides of gate 20 within recesses 38 and 40 surrounding the openings of inlet 14 and outlet 16 into valve chamber 18.

Figure 3:
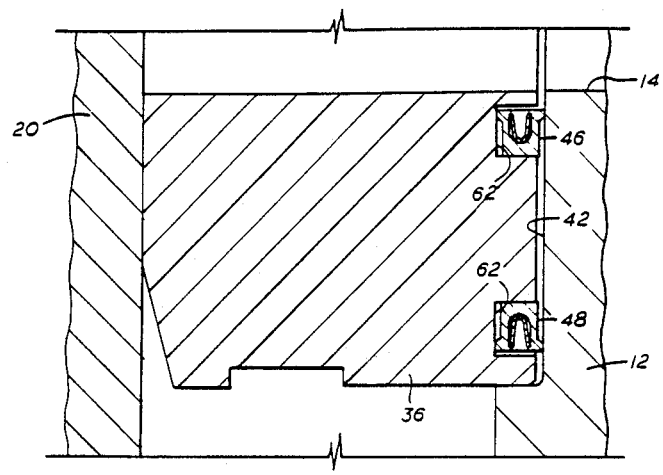
FIG. 3 is an enlarged sectional view of the improved bushing and bushing seals.

Bushings 36 are provided to ensure pressure sealing between the gate 20 and the body 12 around the openings of inlet 14 and outlet 16 into valve chamber 18. Bushings 36 are adapted to provide a metal-to-metal seal against gate 20 and against sealing surfaces 42 and 44 in recesses 38 and 40. As shown in FIG. 3, bushings 36 are provided with inner seal 46 and outer seal 48 to seal against recess surfaces 42 and 44 immediately surrounding the openings into valve chamber 18. It is important that such seals be efficient to exclude all material from surfaces 42 and 44 when the bushing is urged against gate 20 by the pressure within the valve passages 14 or 16.

Seal 46 is a U-shaped seal assembly having the opening of the U facing inwardly and seal 48 is also a U-shaped seal assembly having the opening of the U facing outwardly. In this manner seals 46 and 48 are designed to prevent the leakage of pressure and unwanted fluids and particles into the space between the seals. In this manner, surfaces 42 and 44 are protected so that in the event the valve suffers a pressure reversal so that the bushing 36 is forced against surface 42 the surface is clean so that a suitable metal-to-metal seal is provided under such conditions.

Figure 4:
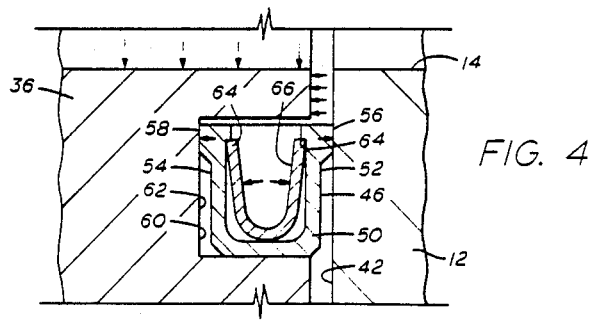
FIG. 4 is a further enlarged sectional view of one of the bushing seals illustrating the details of pressure forces on the seal and the bushing.

As best seen in FIG. 4, each seal 46 and 48 is substantially the same in that they both include resilient U-shaped seal member 50 having legs 52 and 54 with the outer sides of such legs having lip seals 56 and 58 extending outward to seal against surface 42 or 44 and the surface 60 within the bottom of bushing recess 62 in which the seals are positioned. The interior of seal member 50 includes inwardly facing shoulders 64. Spring 66 is formed into a U-shape and is positioned within seal member 50 with its outer ends in engagement with shoulders 64. Spring 66 urges legs 52 and 54 outward so that lip seals 56 and 58 are urged into sealing engagement with surfaces 42 or 44 and 60.

Figure 5:
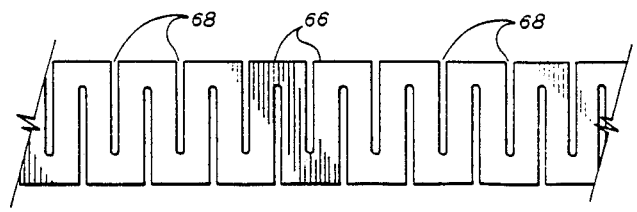
FIG. 5 is a partial layout view of the spring used in the improved seal of the present invention.

Spring 66 is shown in FIG. 5 in a partial layout form to illustrate its configuration. As shown, spring 66 is all one piece with slots 68 cut alternately from the opposite sides. A slotted piece of the proper length is selected and then formed into the U-shape and then is formed into a circle of the correct size to fit into its seal 46 or 48 and then the ends of the spring are secured together, as by welding or any other suitable means.

As best seen in FIG. 4, pressure of fluid within inlet 14 is exerted on bushing 36 to urge it in the direction of gate 20 and this same pressure is exerted within seal 46 to provide a pressure assist in urging seal legs 52 and 54 outward into position to cause lip seals 56 and 58 to seal against surfaces 42 or 44 and 60. The spring 66 and lip seals 56 and 58 are sufficiently strong to prevent collapse of seal member 50 when it is subjected to pressure reversal.

In this manner a complete seal is provided between the bushing and the body recess in which the bushing is positioned by having both an inner and an outer pressure responsive seal which are also urged into tight sealing engagement by the spring directly associated with the seals.

Seal member 50 is preferably made of a material which is resistant to fluids in an oil and gas well, is resistant to extrusion at gaps up to 0.018 inches at 15,000 psi, has a flexural strength above 13,000 psi, avoids deformation sets under load at 300 F has a modulus of 500,000 psi maximum so flexure of the seal is in the elastic range, and has a high mechanical elongation (a minimum of 25%) to avoid cracking under flexure. It has been discovered that the aromatic polymer (polyetheretherketone) produced by Imperial Chemicals Industries under the trade mark "Victrex PEEK" is suitable for the seal member 50. Another suitable material is an engineering thermoplastic (polyethersulphone) marketed by Imperial Chemical Industries under the trade mark "Victrex PES".

Spring 66 is preferred to be a nonferrous metal spring material such as the cobalt-nickel alloy marketed by the Elgiloy Company Division of American Gage and Machine Company of Elgin, Ill. under the trademark "Elgiloy".

While the description of the improved gate valve 10 as hereinbefore set forth describes the passage 14 as the inlet and passage 16 as the outlet, it should be noted that passage 16 could be the inlet and passage 14 could be the outlet as the improved bushing seals of the present invention are bidirectional, i.e., they will function with pressure or flow from either direction.

What is claimed is:

1. A gate valve comprising;

a body having a central gate chamber, an inlet passage extending through the body into communication with the gate chamber, an outlet passage extending through the body into communication with the gate chamber and a recess in the body surrounding the opening of each of the passages into the gate chamber, a floating bushing positioned in each of said recesses, a gate positioned within the chamber, means for moving the gate within the chamber between said floating bushings and between positions communicating flow between the passages and closing flow between the passages, inner and outer unidirectional seals positioned upstream and downstream between the surface of each of the recesses facing the gate and the opposing surface of the bushing in the recess, each of the seals include a U-shaped lip sealing element and a U-shaped spring positioned within the lip sealing element and urging the legs of the element apart into sealing engagement between sealing surfaces on the bushing and the body, the inner seal, which is positioned closest to the passage has the open end of its sealing element facing the passage and the outer seal, which is farther from the passage than the inner seal, has the open end of its sealing element facing away from the passage, each of the seals being positioned within a separate recess in its bushing which separate recess has an axial dimension less than the free axial dimension between the lip sealing surfaces when it is not compressed, the downstream axially seals being compressible to an axial dimension between the lip sealing surfaces which is the same as the axial dimension of their separate recesses responsive to pressure differential loading on the gate when the gate is in a closed position so that their bushings engage the body recess surface in a metal-to-metal seal when they are loaded and are recoverable from such compressed position, the seals being axially extendible to provide a tight seal and maintain sufficient sealing between the bushing and body recess sealing surfaces to prevent entry of contaminants therebetween.

2. A gate valve according to claim 1 wherein
said sealing element includes a pair of legs with a projection on the outer distal surface of each leg, the outer surfaces of said projection functioning as sealing surfaces for engaging the surfaces of the body sealing surface and the bushing sealing surface.

3. A gate valve according to claim 1 wherein
said sealing element is of a material having resistance to well fluids, has extrusion resistance at gaps up to 0.018 inches at 15,000 psi, a flexural strength above 13,000 psi, is not subject to deformation sets under load at temperatures of 300° F., has a maximum modulus of 500,000 psi and a mechanical elongation of at least 25%.

4. A gate valve according to claim 3 wherein
the material of said sealing element is a polyetheretherketone.

5. A gate valve according to claim 3 wherein
the material of said sealing element is a polyethersulfone.

6. A gate valve according to claim 1 wherein
the material of said spring is metal alloy having high resistance to well fluids and a high yield strength.

7. A gate valve according to claim 6 wherein
the material of said spring is selected from the group consisting of cobalt-nickel base alloys, cobalt-chromium base alloys, and nickel base alloys.

8. A gate valve according to claim 6 wherein
the material of said spring is a cobalt-nickel alloy marketed by the Elgiloy Company Division of American Gage and Machine Company of Elgin, Ill. under the mark "Elgiloy".

* * * * *